US009416519B2

(12) United States Patent
Kobiki

(10) Patent No.: US 9,416,519 B2
(45) Date of Patent: Aug. 16, 2016

(54) WHEEL LOADER

(71) Applicant: KOMATSU LTD., Minato-ku, Tokyo (JP)

(72) Inventor: Yasuhiro Kobiki, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/781,842

(22) PCT Filed: Apr. 2, 2014

(86) PCT No.: PCT/JP2014/059781
§ 371 (c)(1),
(2) Date: Oct. 1, 2015

(87) PCT Pub. No.: WO2014/175026
PCT Pub. Date: Oct. 30, 2014

(65) Prior Publication Data
US 2016/0024755 A1  Jan. 28, 2016

(30) Foreign Application Priority Data

Apr. 26, 2013 (JP) .................................. 2013-093854

(51) Int. Cl.
| | |
|---|---|
| *E02F 3/34* | (2006.01) |
| *F16H 47/04* | (2006.01) |
| *F16H 47/02* | (2006.01) |
| *F16H 61/02* | (2006.01) |
| *F16H 61/04* | (2006.01) |
| *F16H 61/66* | (2006.01) |
| *F16H 47/10* | (2006.01) |
| *E02F 9/22* | (2006.01) |
| *E02F 3/42* | (2006.01) |
| *E02F 9/20* | (2006.01) |
| *F16H 37/08* | (2006.01) |

(52) U.S. Cl.
CPC ................. *E02F 9/2253* (2013.01); *E02F 3/34* (2013.01); *E02F 3/422* (2013.01); *E02F 9/2062* (2013.01); *E02F 9/2079* (2013.01); *E02F 9/2296* (2013.01); *F16H 47/02* (2013.01); *F16H 47/04* (2013.01); *F16H 61/02* (2013.01); *F16H 61/04* (2013.01); *F16H 47/10* (2013.01); *F16H 61/66* (2013.01); *F16H 2037/0886* (2013.01); *F16H 2047/045* (2013.01); *F16H 2200/2005* (2013.01)

(58) Field of Classification Search
None
See application file for complete search history.

(56) References Cited

U.S. PATENT DOCUMENTS 3,470,769 A * 10/1969 Livezey ................. B60K 17/10
475/24
5,193,416 A   3/1993 Kanayama
(Continued)

FOREIGN PATENT DOCUMENTS

JP   H02-038745 A   8/1990
JP   H02-195062 A   8/1990
(Continued)

OTHER PUBLICATIONS

International Search Report dated Jul. 1, 2015 for corresponding International Patent Application No. PCT/JP2014/059781, including English translation, 4 pages.

*Primary Examiner* — Colby M Hansen
(74) *Attorney, Agent, or Firm* — Fish & Richardson P.C.

(57) ABSTRACT

A wheel loader includes: a mechanical drive unit; a mechanical drive clutch controlling transmission/cutoff of a power in the mechanical drive unit; an HST pump driven by an engine; a hydraulic motor driven by a hydraulic oil delivered from the HST pump; a hydraulic drive unit; a hydraulic drive clutch controlling transmission/cutoff of a power in the hydraulic drive unit; a load detecting unit detecting an amount of a load; a vehicle speed sensor detecting a vehicle speed; a switching controlling unit setting a switching vehicle speed in accordance with the amount of the load; and a vehicle-body controller switching between mechanical drive state and hydraulic drive state based on the switching controlling unit. The switching controlling unit sets the switching vehicle speed at a high-speed side when the load becomes large and at a low-speed side when the load becomes small.

11 Claims, 11 Drawing Sheets

(56) References Cited

U.S. PATENT DOCUMENTS

| | | |
|---|---|---|
| 6,616,559 B1 | 9/2003 | Hori et al. |
| 7,070,531 B2 * | 7/2006 | Ishizaki ............ F16H 47/04 475/75 |
| 7,195,580 B2 * | 3/2007 | Funato ............ B60W 10/06 477/110 |
| 7,361,111 B2 * | 4/2008 | Aitzetmueller ....... F16H 37/084 475/83 |
| 2004/0211614 A1 | 10/2004 | Matsuyama |
| 2008/0275612 A1 | 11/2008 | Vesenjak |

FOREIGN PATENT DOCUMENTS

| | | |
|---|---|---|
| JP | H03-061755 A | 9/1991 |
| JP | 2000-130558 A | 5/2000 |
| JP | 2003-185016 A | 7/2003 |
| JP | 2004-144254 A | 5/2004 |
| JP | 2009-518567 A | 5/2009 |

* cited by examiner

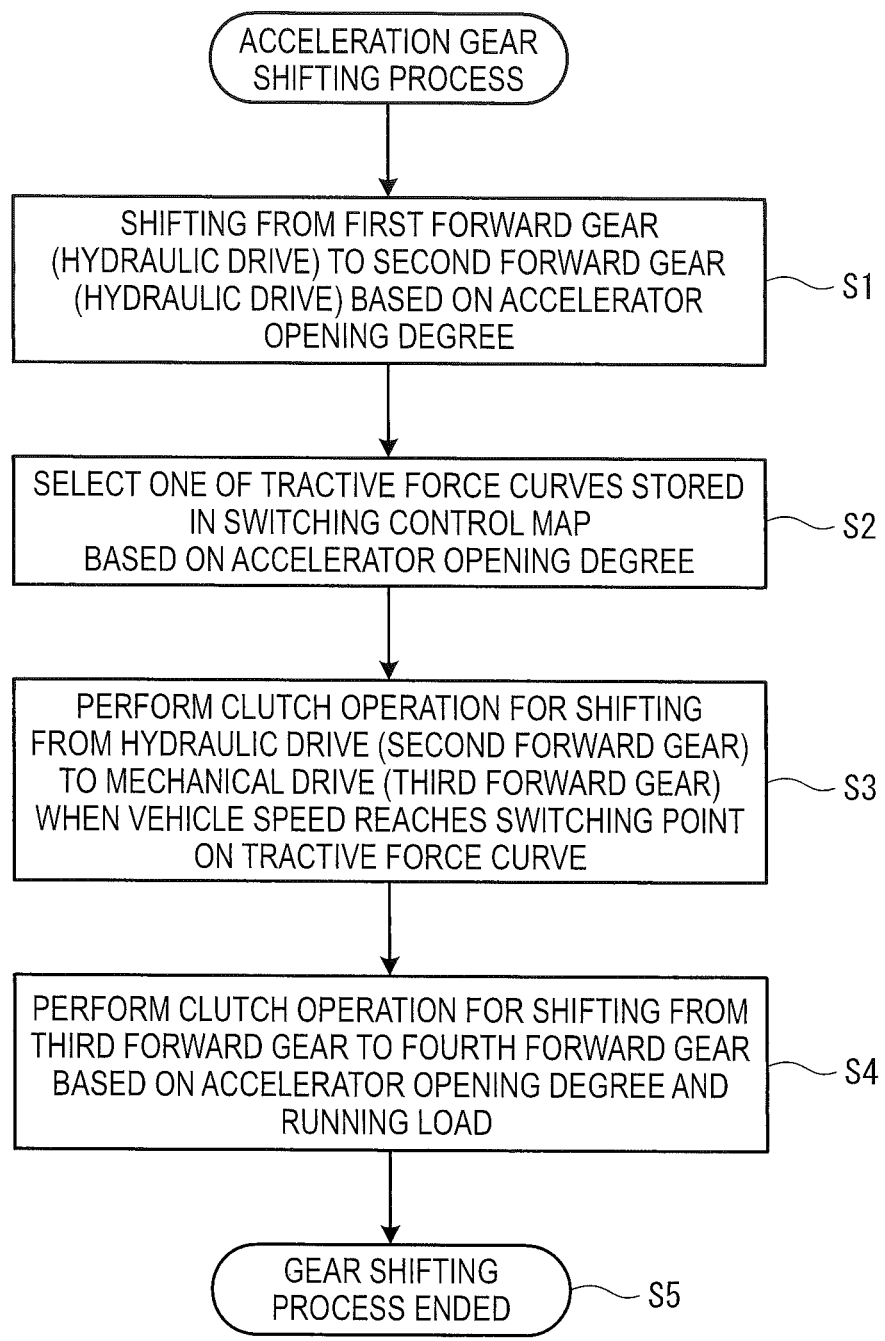

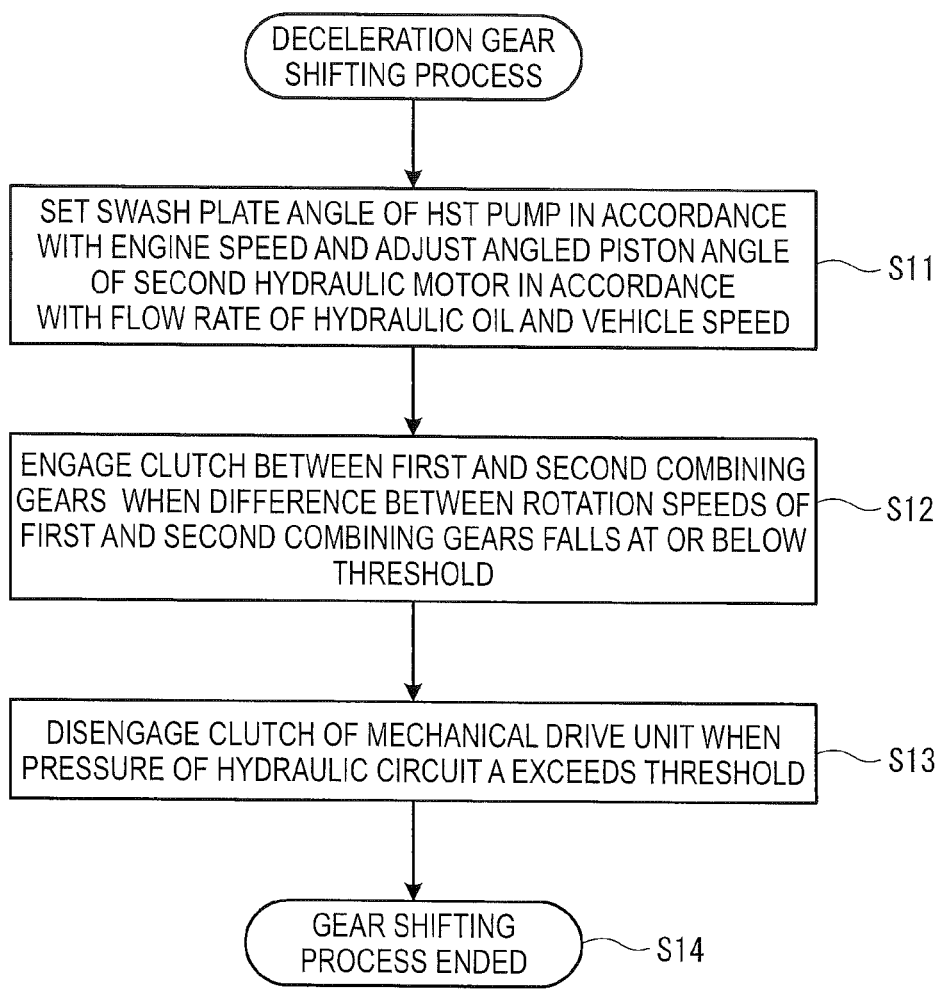

WHEEL LOADER

CROSS-REFERENCE TO RELATED APPLICATIONS

This application claims priority to International Application No. PCT/JP2014/059781 filed on Apr. 2, 2014, which application claims priority to Japanese Application No. 2013-093854, filed on Apr. 26, 2013. The contents of the above applications are incorporated herein by reference in their entireties.

TECHNICAL FIELD

The present invention relates to a wheel loader including a backhoe loader. In particular, the present invention relates to a wheel loader provided with a transmission capable of switching between hydraulic actuation and mechanical actuation.

BACKGROUND ART

Some wheel loaders are provided with a so-called hydro static transmission (HST) so that a hydraulic pump is driven by an engine output and a traveling hydraulic motor is driven by a hydraulic oil discharged from the hydraulic pump for the traveling of the vehicle.

Some wheel-type excavators, rough terrain cranes and the like employ a hydraulic mechanical transmission (HMT) system including a combination of HST and mechanical transmission (see, for instance, Patent Literature 2).

According to Patent Literature 2, hydraulic drive is automatically selected when a measured rotation speed of an output shaft is a predetermined value or less, whereas mechanical drive is automatically selected when the measured rotation speed is the predetermined value or more.

CITATION LIST

Patent Literature(s)

Patent Literature 1: JP-A-2004-144254
Patent Literature 2: JP-A-2-195062

SUMMARY OF THE INVENTION

Problem(s) to be Solved by the Invention

HST, which is a continuously variable transmission, has some advantages. For instance, the vehicle can travel with a load in bucket without a problem that the load falls off the bucket due to a gear shift shock. Further, HST efficiently works during a low-speed operation requiring a high tractive force.

However, HST entails a problem of a decrease in efficiency during a high-speed operation. Therefore, when the vehicle, which may be a wheel loader or a backhoe loader, has to travel a certain amount of distance to a dump truck or a hopper with a load in the bucket, a decrease in efficiency is inevitable.

In contrast, when HST is switched to a mechanical drive mechanism in response to an increase in speed as in, for instance, a wheel-type excavator of Cited Document 2, efficiency during a high-speed operation can be improved. However, since a wheel-type excavator or the like is not designed to travel with a load in the bucket, a problem that a load may fall due to a switching shock resulting from the switching from hydraulic drive to mechanical drive is not typically taken into account.

An object of the invention is to provide a wheel loader capable of switching hydraulic drive and mechanical drive depending on efficiency with a reduced switching shock.

Means for Solving the Problem(s)

According to a first aspect of the invention, a wheel loader includes: an engine; a drive shaft; a transmission including an input shaft through which a power from the engine is inputted and an output shaft through which the power from the engine is outputted to the drive shaft, the transmission being configured to perform a gear-shifting operation between the input shaft and the output shaft; a mechanical drive unit including a plurality of gear trains driven by the power from the engine; a mechanical drive clutch provided to the mechanical drive unit to control transmission and cutoff of the power from the engine; a variable displacement hydraulic pump configured to be driven by the power from the engine to deliver a hydraulic oil for traveling; a variable displacement hydraulic motor configured to be driven by the hydraulic oil delivered from the hydraulic pump; a hydraulic drive unit including a plurality of gear trains driven by a power from the hydraulic motor; a hydraulic drive clutch provided to the hydraulic drive unit to control transmission and cutoff of the power from the hydraulic motor; a load detecting unit configured to detect an amount of a load driven by the power from the engine; a vehicle speed detecting unit configured to detect a vehicle speed; a switching controlling unit configured to set a switching vehicle speed in accordance with the amount of the load, the switching controlling unit setting the switching vehicle speed at a high-speed side when the load becomes large and setting the switching vehicle speed at a low-speed side when the load becomes small; and a controller configured to switch between a hydraulic drive state where the output shaft is driven by the hydraulic drive unit and a mechanical drive state where the output shaft is driven by the mechanical drive unit based on the switching controlling unit, the controller controlling the mechanical drive clutch and the hydraulic drive clutch to switch from the hydraulic drive state to the mechanical drive state when the vehicle speed detected by the vehicle speed detecting unit reaches the switching vehicle speed set by the switching controlling unit in accordance with the load detected by the load detecting unit during acceleration of the wheel loader in the hydraulic drive state.

According to a second aspect of the invention, the controller lowers an engine speed and increases a displacement of the hydraulic pump and/or reduces a displacement of the hydraulic motor before switching from the hydraulic drive state to the mechanical drive state.

According to a third aspect of the invention, the controller controls fuel injection to the engine to reduce an engine torque when switching from the hydraulic drive state to the mechanical drive state.

According to a fourth aspect of the invention, the hydraulic pump and the hydraulic motor each have a variable displacement, and the controller controls at least the displacement of the hydraulic pump to be zero after switching from the hydraulic drive state to the mechanical drive state.

According to a fifth aspect of the invention, a wheel loader includes: an engine; a drive shaft; a transmission including an input shaft through which a power from the engine is inputted and an output shaft through which the power from the engine is outputted to the drive shaft, the transmission being configured to perform a gear-shifting operation between the input shaft and the output shaft; a mechanical drive unit including a plurality of gear trains driven by the power from the engine; a mechanical drive clutch provided to the mechanical drive unit to control transmission and cutoff of the power from the engine; a variable displacement hydraulic pump configured to be driven by the power from the engine to deliver a hydraulic oil for traveling; a variable displacement hydraulic motor configured to be driven by the hydraulic oil delivered from the hydraulic pump; a hydraulic drive unit including a plurality of gear trains driven by a power from the hydraulic motor; a hydraulic drive clutch provided to the hydraulic drive unit to control transmission and cutoff of the power from the hydraulic motor; a vehicle speed detecting unit configured to detect a vehicle speed; and a controller configured to switch between a hydraulic drive state where the output shaft is driven by the hydraulic drive unit and a mechanical drive state where the output shaft is driven by the mechanical drive unit, in which in order to switch from the mechanical drive state to the hydraulic drive state during deceleration of the wheel loader in the mechanical drive state, the controller: sets a displacement of the hydraulic pump at a value corresponding to an engine speed; adjusts a displacement of the hydraulic motor to make a motor speed of the hydraulic motor become a value corresponding to a discharge amount of the hydraulic pump and the vehicle speed; and engages the hydraulic drive clutch when a difference between rotation speeds on upstream and downstream of the hydraulic drive clutch reaches a threshold or less and disengages the mechanical drive clutch when a pressure of the hydraulic oil delivered from the hydraulic pump to the hydraulic motor increases to a predetermined value or more.

According to a sixth aspect of the invention, the controller increases the motor speed of the hydraulic motor before switching from the mechanical drive state to the hydraulic drive state during deceleration of the wheel loader in the mechanical drive state.

According to a seventh aspect of the invention, each of mechanical drive clutch and the hydraulic drive clutch is a modulation clutch.

According to an eighth aspect of the invention, the mechanical drive unit is used only when the wheel loader travels forward, and the wheel loader reverses only using the hydraulic drive unit.

In a first aspect, the wheel loader includes the switching controlling unit that sets the switching vehicle speed at the high-speed side when the load becomes large and sets the switching vehicle speed at the low-speed side when the load becomes small. When the wheel loader in the hydraulic drive state is accelerated and the vehicle speed detected by the vehicle speed detecting unit reaches the switching vehicle speed set by the switching controlling unit in accordance with the load detected by the load detecting unit, the controller controls the mechanical drive clutch and the hydraulic drive clutch to switch from the hydraulic drive state to the mechanical drive state.

A difference between engine speeds before and after switching from the hydraulic drive to the mechanical drive can thus be relatively small, so that the hydraulic drive can be smoothly switched to the mechanical drive with a reduced switching shock resulting from gear shift, thereby preventing a load in the bucket from falling off.

When the load is small and the engine speed is low under the hydraulic drive, the switching vehicle speed is set low to reduce the switching shock. Further, the hydraulic drive can be switched to the mechanical drive early, thereby improving efficiency and reducing fuel consumption.

In the second aspect, the engine speed is lowered before the hydraulic drive state is switched to the mechanical drive state.

Further, at least one of adjustment for increasing the displacement of the hydraulic pump and adjustment for reducing the displacement of the hydraulic motor is performed. The difference in engine speed resulting from switching from the hydraulic drive to the mechanical drive can thus be further reduced and, consequently, a gear shift shock can be further reduced.

In the third aspect, in switching from the hydraulic drive state to the mechanical drive state, the fuel injection to the engine is controlled to reduce the engine torque. Therefore, torque generated when the hydraulic drive is switched to the mechanical drive can thus be reduced and a gear shift shock resulting from a rapid torque increase can be avoided. Consequently, the gear shift shock can thus be further reduced.

In the fourth aspect, the hydraulic pump and the hydraulic motor each have a variable displacement, and at least the displacement of the hydraulic pump is controlled to be zero after the hydraulic drive state is switched to the mechanical drive state. The power consumption of the hydraulic pump during the mechanical drive can be reduced and, consequently, efficiency can be improved.

In the fifth aspect, in order to switch from the mechanical drive state to the hydraulic drive state during deceleration of the wheel loader in the mechanical drive state, the displacement of the hydraulic pump is set at a value corresponding to the engine speed, the displacement of the hydraulic motor is adjusted to make the motor speed of the hydraulic motor become a value corresponding to the discharge amount of the hydraulic pump and the vehicle speed, and engages the hydraulic drive clutch when a difference between rotation speeds before and after the hydraulic drive clutch reaches a threshold or less and disengages the mechanical drive clutch when a pressure of the hydraulic oil delivered from the hydraulic pump to the hydraulic motor increases to a predetermined value or more. A gear shift shock during a deceleration process for switching from the mechanical drive to the hydraulic drive can thus be reduced, so that the mechanical drive can be smoothly switched to the hydraulic drive. Consequently, a load in the bucket can be prevented from falling off during deceleration, thereby improving efficiency and reducing fuel consumption.

In the sixth aspect, the motor speed of the hydraulic motor is increased before the mechanical drive state is switched to the hydraulic drive state during deceleration of the wheel loader in the mechanical drive state. Therefore, when the clutch is engaged to connect the hydraulic drive unit to the output shaft rotated in the mechanical drive unit, a difference between rotation speeds on the upstream and downstream of the clutch can be reduced to smoothly switch to the hydraulic drive state.

In the seventh aspect, each of the mechanical drive clutch and the hydraulic drive clutch is a modulation clutch. Therefore, for instance, a controlling hydraulic pressure is controlled based on a variation pattern defined as a modulation pattern, so that the clutch is temporarily set in a so-called semi-clutch state (an interim value of the engagement ratio) to reduce a gear shift shock.

In the eighth aspect, the mechanical drive unit is used only when the wheel loader travels forward, and the wheel loader reverses only using the hydraulic drive unit. Therefore, a mechanical drive switching clutch for reverse, which causes a large loss during a forward travel, may be omitted and, consequently, efficiency can be improved.

BRIEF DESCRIPTION OF DRAWING(S)

FIG. 1 schematically illustrates a wheel loader according to the exemplary embodiment of the invention and a power transmission system thereof.

FIG. 2 schematically illustrates a power transmission route in a transmission.

Figure 6:
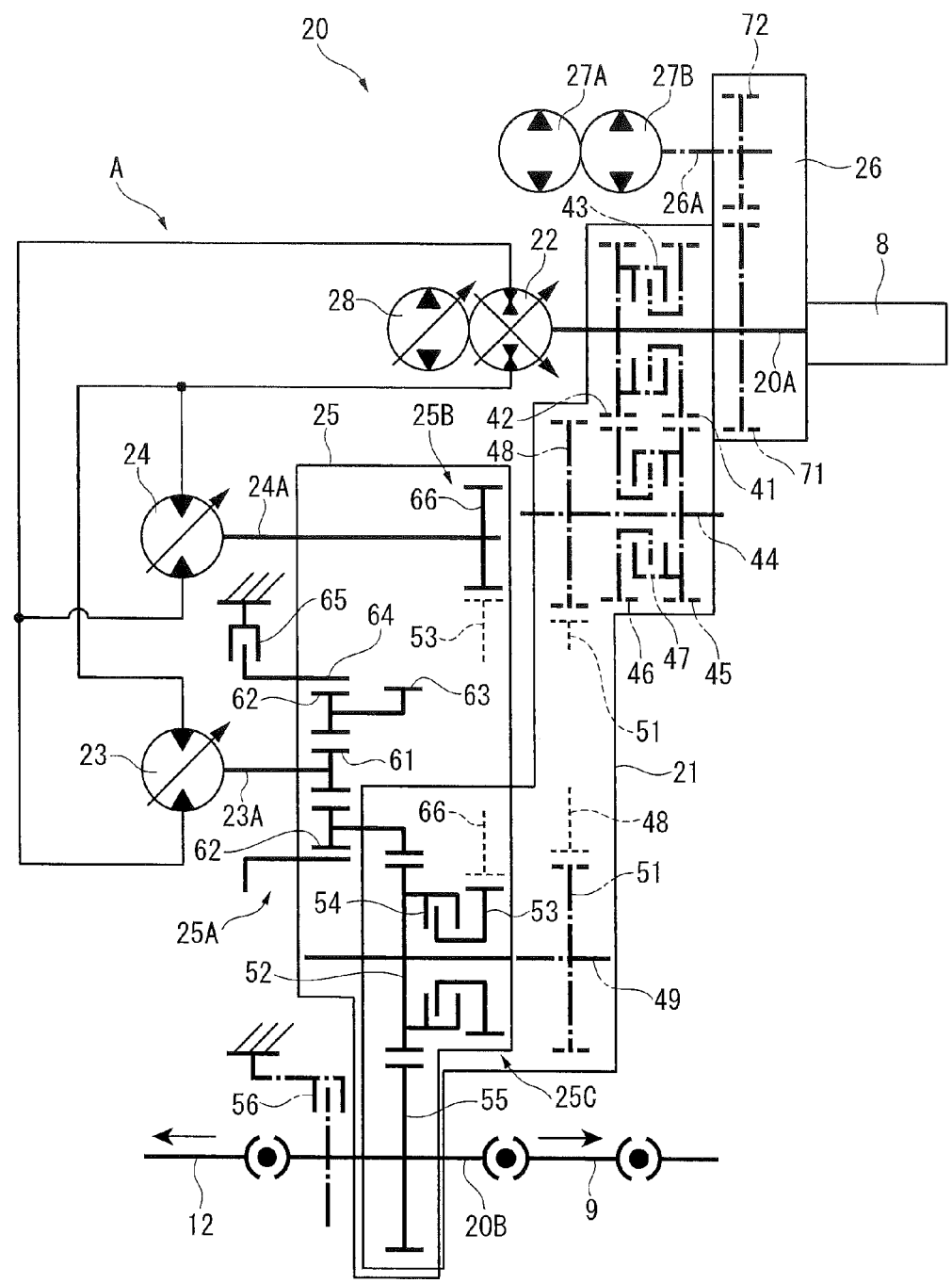

FIG. 6 schematically illustrates a power transmission route in the transmission at a first forward gear or a first reverse gear.

Figure 7:
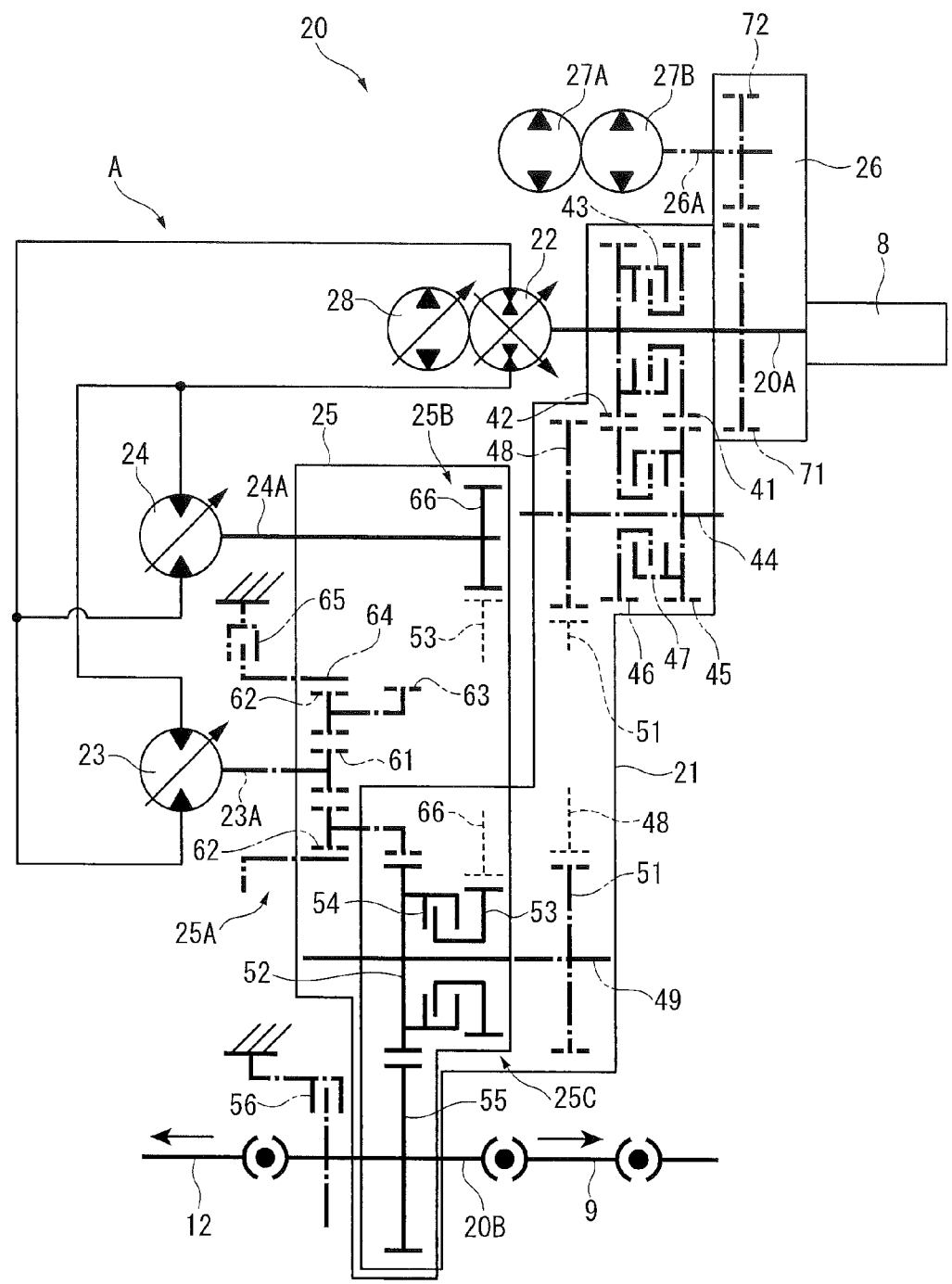

FIG. 7 schematically illustrates a power transmission route in the transmission at a second forward gear or a second reverse gear.

Figure 8:
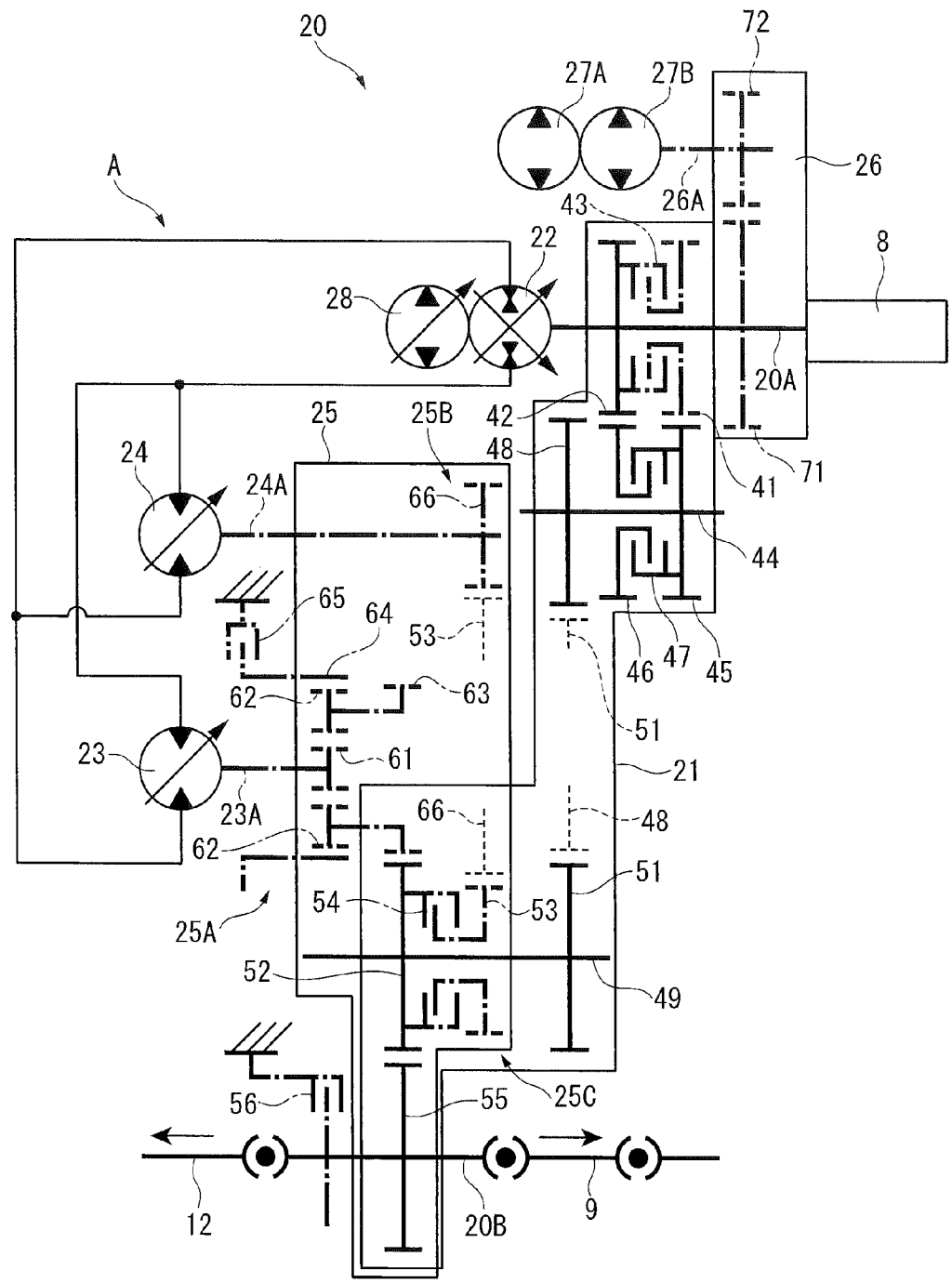

FIG. 8 schematically illustrates a power transmission route in the transmission at a third forward gear.

Figure 9:
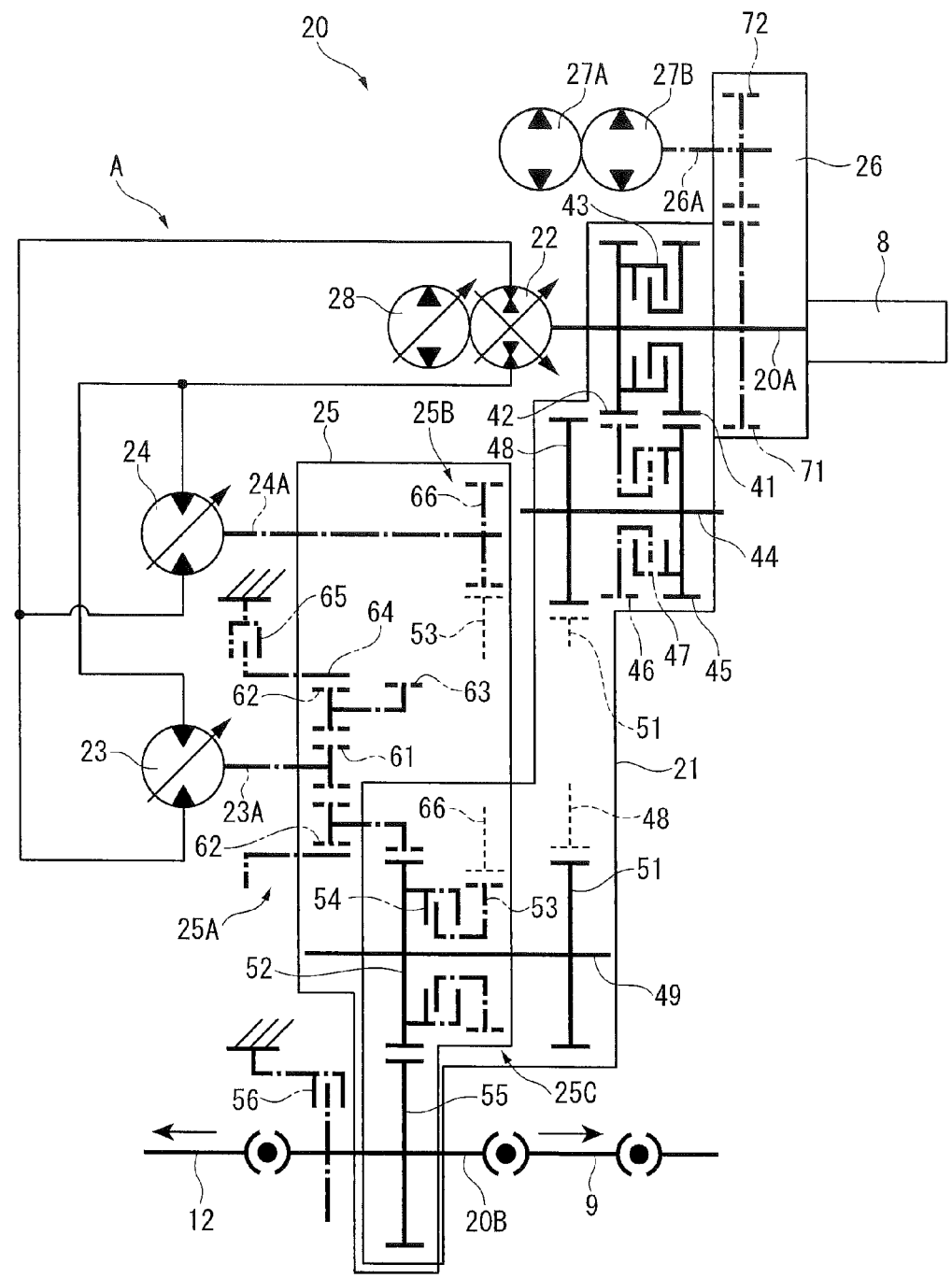

FIG. 9 schematically illustrates a power transmission route in the transmission at a fourth forward gear.

FIG. 10 is a flowchart showing an acceleration gear shifting process.

FIG. 11 is a flowchart showing a deceleration gear shifting process.

DESCRIPTION OF EMBODIMENT(S)

Exemplary embodiment(s) of the invention will be described below with reference to the attached drawings.

Figure 1:
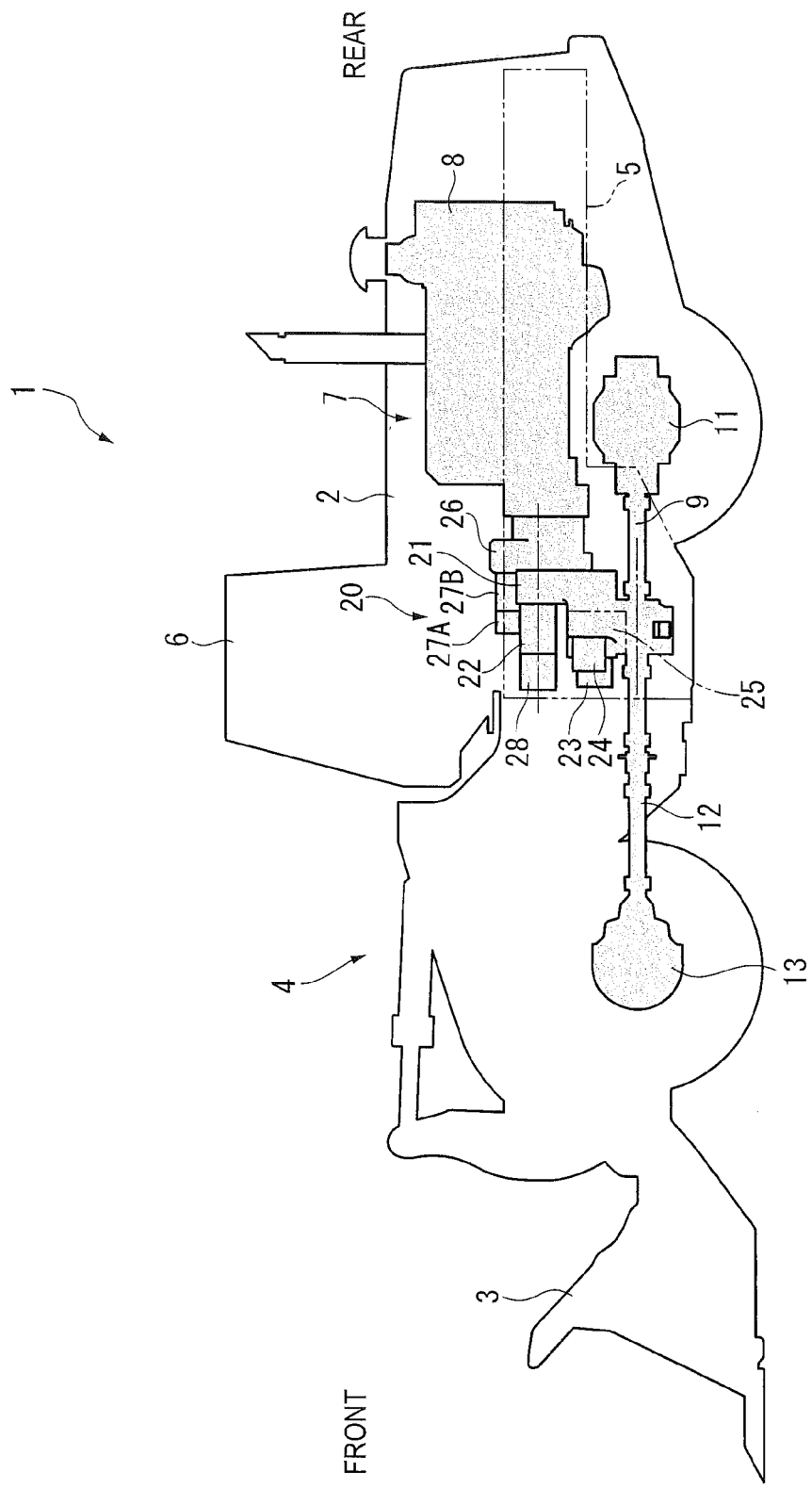

FIG. 1 is a transparent view schematically illustrating a wheel loader 1 according to an exemplary embodiment and a power transmission system thereof for traveling. It should be noted that directions of front, rear, right and left hereinafter mean directions of front, rear, right and left from an operator seated in a cab 6 shown in FIG. 1.

Overall Arrangement of Wheel Loader

As shown in FIG. 1, the wheel loader 1 is substantially the same as a typical wheel loader except, for instance, an arrangement of a transmission 20 (described later) and appearance. Specifically, the wheel loader 1 includes: a vehicle body 2 including a front vehicle body and a rear vehicle body; and a bucket 3, which is working equipment for excavation and loading, attached to a front side of the front vehicle body through a hydraulic working equipment drive mechanism 4 including, for instance, a boom, a bell crank, a connecting link, a bucket cylinder and a boom cylinder.

The rear vehicle body includes a rear vehicle body frame 5 (shown by a two-dot chain line in FIG. 1) made of, for instance, a thick metal plate. The box-shaped cab 6 where an operator is to be seated is provided on a front upper portion of the rear vehicle body frame 5. The transmission 20 is provided at a front lower portion of the rear vehicle body frame 5. An engine compartment 7 is provided at a rear side of the rear vehicle body frame 5.

Overall Arrangement of Power Transmission System

In the engine compartment 7, a power source, i.e., a diesel engine (hereinafter, simply referred to as "engine") 8 is mounted. In the wheel loader 1, an axial direction of a crankshaft of the engine 8 is parallel with a front-rear direction of the vehicle body, and power from the engine 8 is outputted through a flywheel (not shown) provided at a front side of the engine 8.

The power outputted through the flywheel is inputted to the transmission 20. A part of the power outputted from the transmission 20 is transmitted to a rear axle 11 through a rear drive shaft 9 and to rear wheels. Another part of the power outputted from the transmission 20 is transmitted to a front axle 13 through a front drive shaft 12 and to front wheels.

Arrangement of Transmission

Figure 2:
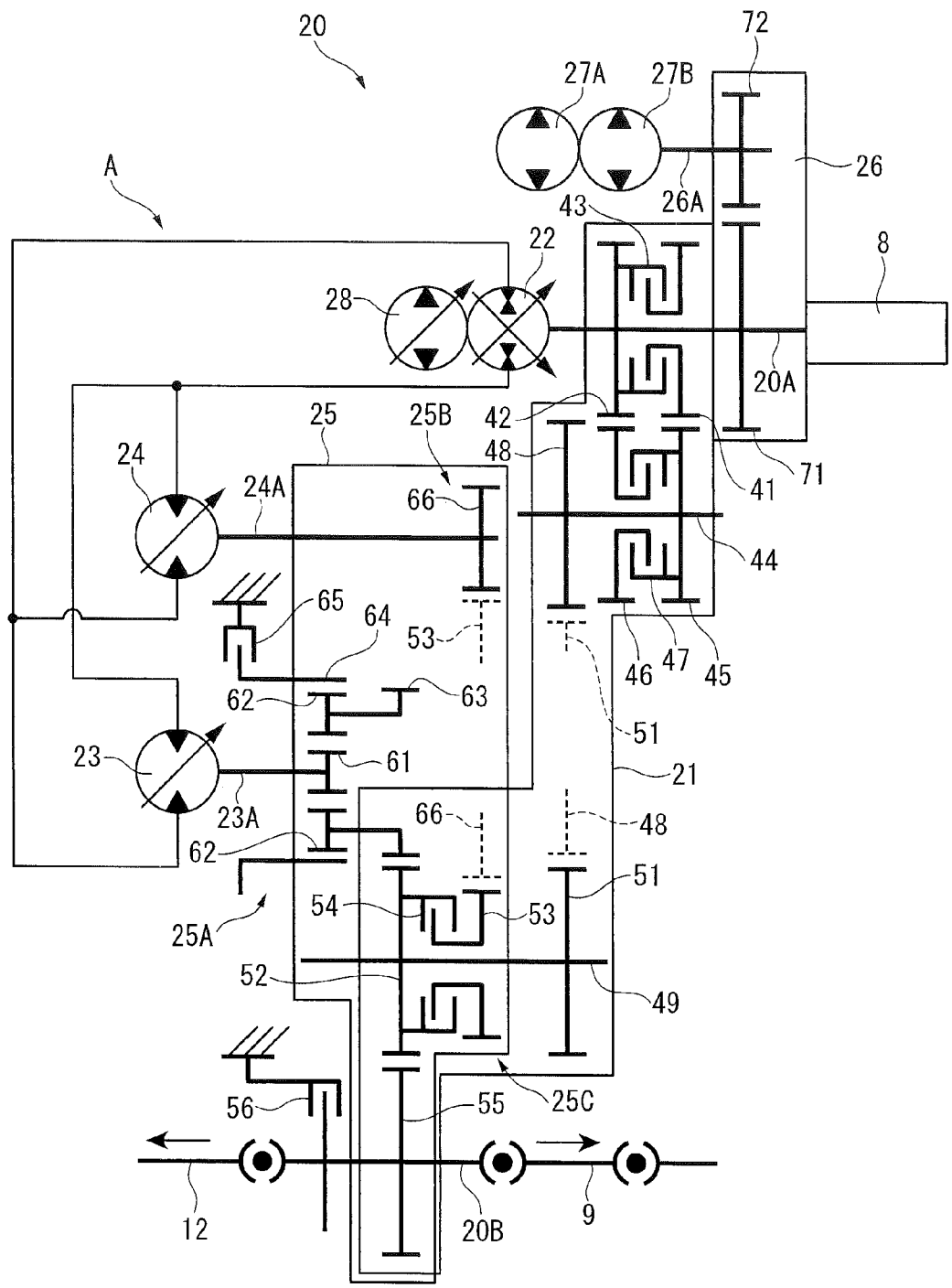

FIG. 2 schematically illustrates a power transmission route in the transmission 20.

In the exemplary embodiment, the transmission 20 is capable of switching between mechanical drive and hydraulic drive for transmitting the power inputted from the engine 8 to the drive shafts 9, 12.

The transmission 20 thus includes a mechanical drive unit 21 that transmits the power through gear trains to the drive shafts 9, 12; a hydraulic static transmission (HST) pump 22 (a hydraulic pump) that delivers a hydraulic oil for the hydraulic drive; first hydraulic motor 23 and second hydraulic motor 24 that are driven by the hydraulic oil delivered from the HST pump 22; and a hydraulic drive unit 25 that transmits power inputted from the first hydraulic motor 23 and the second hydraulic motor 24 to the drive shafts 9, 12 through the gear trains.

Setting of Gear Position

In the exemplary embodiment, the transmission 20 is configured to be shifted into first to fourth forward gears (low speed to high speed) and first to second reverse gears (low speed to high speed). The mechanical drive unit 21 is related to the third and fourth forward gears.

HST power transmission using the HST pump 22, the first hydraulic motor 23, the second hydraulic motor 24 and the hydraulic drive unit 25 is related to the first and second forward gears and the first and second reverse gears.

Mechanical Drive Unit

As shown in FIG. 2, the flywheel (not shown) of the engine 8 is connected to an engine shaft 20A of the transmission 20.

The mechanical drive unit 21 includes: a gear 41 rotatably supported by the engine shaft 20A; a gear 42 attached to the engine shaft 20A; a clutch 43 provided between the gears 41, 42; an intermediate shaft 44 provided below the engine shaft 20A; a gear 45 attached to the intermediate shaft 44 and meshing with the gear 41; a gear 46 rotatably supported by the intermediate shaft 44 and meshing with the gear 42; a clutch 47 provided between the gears 45, 46, a gear 48 similarly attached to the intermediate shaft 44; a combining shaft 49 provided below the intermediate shaft 44; a gear 51 attached to the combining shaft 49 and meshing with the gear 48; a first combining gear 52 similarly attached to the combining shaft 49; a second combining gear 53 provided adjacent to the first combining gear 52; a clutch 54 provided between the first combining gear 52 and the second combining gear 53; and a gear 55 attached to an output shaft 20B and meshing with the first combining gear 52.

It should be noted that although FIG. 2 shows that the gear 48 and the gear 51 are spaced from each other and the second combining gear 53 and a gear 66 (described later) are spaced from each other for a reason of drawing, these gears actually mesh with each other.

In the exemplary embodiment, the output shaft 20B is provided with a multi-plate parking brake 56.

Mechanical Drive Clutch

The clutches 43, 47 of the mechanical drive unit 21 are multi-plate hydraulic wet clutches. The clutches 54, 65 (described later) are also multi-plate hydraulic wet clutches.

When the clutches 43, 47 are disengaged, the rotation of the engine shaft 20A is transmitted to the gears 42, 46 but not to the gears 41, 45. Consequently, the power is not transmitted to the intermediate shaft 44 and the downstream therefrom in the mechanical drive unit 21.

When the clutch 43 is engaged and the clutch 47 is disengaged, the rotation of the engine shaft 20A is transmitted to the gear 45 through the gear 42 and the gear 41, so that the power is transmitted through the intermediate shaft 44, to which the gear 45 is fixed, up to the gear 55 to cause the rotation of the output shaft 20B.

When the clutch 47 is engaged and the clutch 43 is disengaged, the rotation of the engine shaft 20A is transmitted to the gear 45 through the gear 42 and the gear 46, so that the power is transmitted through the intermediate shaft 44, to which the gear 45 is fixed, up to the gear 55 to cause the rotation of the output shaft 20B.

As described above, transmission/cutoff of the power in the mechanical drive unit 21 can be controlled by controlling engagement/disengagement of the clutches 43, 47. The clutches 43, 47 thus define a mechanical drive clutch.

HST Pump

The HST pump 22 is connected to the engine shaft 20A along with an accessory pump 28 that delivers a hydraulic oil for driving the working equipment drive mechanism 4. The HST pump 22 is a bidirectional swash-plate type variable displacement pump, in which a swash plate is inclinable to both of positive-angle side and negative-angle side with reference to a swash plate angle of zero degrees. A discharge direction of the hydraulic oil from the HST pump 22 changes and, consequently, rotation directions of the first hydraulic motor 23 and the second hydraulic motor 24 change depending on the swash plate angle, which is set positive or negative over or below zero degrees. When a pressure at an outlet side becomes higher than a pressure at an inlet side in the HST pump 22, the HST pump 22 functions as a hydraulic motor to adversely bias the engine 8 so that engine brake is applied.

It should be noted that the hydraulic pump may be an angled-piston type pump. In other words, any variable displacement hydraulic pump is usable as long as displacement can be changed by controlling a swash plate angle or an angled piston angle.

Hydraulic Motor

The first hydraulic motor 23 and the second hydraulic motor 24, which are angled-piston type variable displacement motors capable of bidirectional rotation, are juxtaposed to each other in a hydraulic circuit A including the HST pump 22. The respective rotation directions of the first hydraulic motor 23 and the second hydraulic motor 24 can be switched by changing the discharge direction of the hydraulic oil from the HST pump 22. Specifically, the normal rotation of the first hydraulic motor 23 and the second hydraulic motor 24 makes the wheel loader 1 travel forward, whereas the inverse rotation makes the wheel loader 1 reverse.

It should be noted that the hydraulic motors may be swash-plate type motors. In other words, any variable displacement hydraulic motor is usable as long as displacement can be changed by controlling a swash plate angle or an angled piston angle.

Hydraulic Drive Unit

The hydraulic drive unit 25 includes: a first hydraulic drive unit 25A that transmits power outputted from the first hydraulic motor 23; a second hydraulic drive unit 25B that transmits power outputted from the second hydraulic motor 24; a power combining unit 25C that combines the power transmitted through the first hydraulic drive unit 25A and the power transmitted through the second hydraulic drive unit 25B and outputs the combined power.

First Hydraulic Drive Unit

The first hydraulic drive unit 25A includes a planetary mechanism. Specifically, the first hydraulic drive unit 25A includes: a sun gear 61 attached to an output shaft 23A of the first hydraulic motor 23; a plurality of planetary gears 62 arranged around the sun gear 61 and meshing with the sun gear 61; a gear-shaped carrier 63 on which the planetary gears 62 are supported; a ring gear 64 disposed to surround outer circumferences of the planetary gears 62 and mesh with the planetary gears 62, the ring gear 64 rotating coaxially with the output shaft 23A; and a clutch 65 disposed between the ring gear 64 and a transmission casing (not shown).

Second Hydraulic Drive Unit

The second hydraulic drive unit 25B includes: the gear 66 attached to an output shaft 24A of the second hydraulic motor 24; the second combining gear 53 rotatably supported by the combining shaft 49 and meshing with the gear 66; and a clutch 54 disposed between the first combining gear 52 and the second combining gear 53.

Power Combining Unit

The power combining unit 25C includes: a first combining gear 52 that meshes with the carrier 63 to receive power transmitted from the first hydraulic drive unit 25A and receives power transmitted from the second hydraulic drive unit 25B when the clutch 54 is engaged; and a gear 55 that meshes with the first combining gear 52.

Hydraulic Drive Clutch

When the clutch 65 of the hydraulic drive unit 25 is engaged, power from the first hydraulic motor 23 driven with the hydraulic oil from the HST pump 22 is transmitted to the power combining unit 25C through the first hydraulic drive unit 25A. Specifically, the power from the first hydraulic motor 23 is transmitted to the planetary gears 62 through the sun gear 61. Since the ring gear 64 is immobilized by the clutch 65 and thus not rotated, the planetary gears 62 each revolve around the sun gear 61 while rotating on its own axis. Simultaneously, the carrier 63 rotates at a reduced speed. The power from the first hydraulic motor 23 is thus transmitted to the first combining gear 52 through the carrier 63.

When the clutch 54 is engaged, power from the second hydraulic motor 24 is transmitted to the second combining gear 53 through the gear 66 and further to the first combining gear 52 through the clutch 54.

Therefore, when the clutches 54, 65 are both engaged, the power from the first hydraulic motor 23 and the power from the second hydraulic motor 24 are combined by the first combining gear 52. The combined power is transmitted from the first combining gear 52 to the output shaft 20B through the gear 55.

In contrast, when the clutches 54, 65 are both disengaged, the power from the first hydraulic motor 23 and the power from the second hydraulic motor 24 are not transmitted to the first combining gear 52.

As described above, transmission/cutoff of the power in the hydraulic drive unit 25 can be controlled by controlling engagement/disengagement of the clutches 54, 65. The clutches 54, 65 thus define a hydraulic drive clutch.

Combination of Mechanical Drive Unit and Hydraulic Drive Unit

It should be noted that the first combining gear 52 and the gear 55 are also components of the mechanical drive unit 21 in the exemplary embodiment. The power combining unit 25C can thus not only combine the power from the first hydraulic motor 23 and the power from the second hydraulic motor 24, but also combine the power from the mechanical drive unit 21 and the power from the hydraulic drive unit 25.

PTO

The transmission 20 includes a power take off (PTO) 26 disposed near a power input side (i.e., near the engine 8).

The PTO 26 includes: a gear 71 attached to the engine shaft 20A; a gear 72 that meshes with the gear 71; and a PTO shaft 26A that is a rotary shaft attached with the gear 72. In the exemplary embodiment, the PTO shaft 26A is connected to two hydraulic pumps 27A, 27B. The PTO 26 is in operation whenever the engine 8 is driven. It should be noted that the hydraulic pumps 27A, 27B are optional components and may thus be omitted. In this case, the PTO shaft 26A rotates with substantially no load. Other device(s) may be connected to the PTO shaft 26A in place of the hydraulic pumps 27A, 27B.

Control Circuit for Transmission 20

Next, description will be made on a control circuit for controlling the transmission 20.

Figure 3:
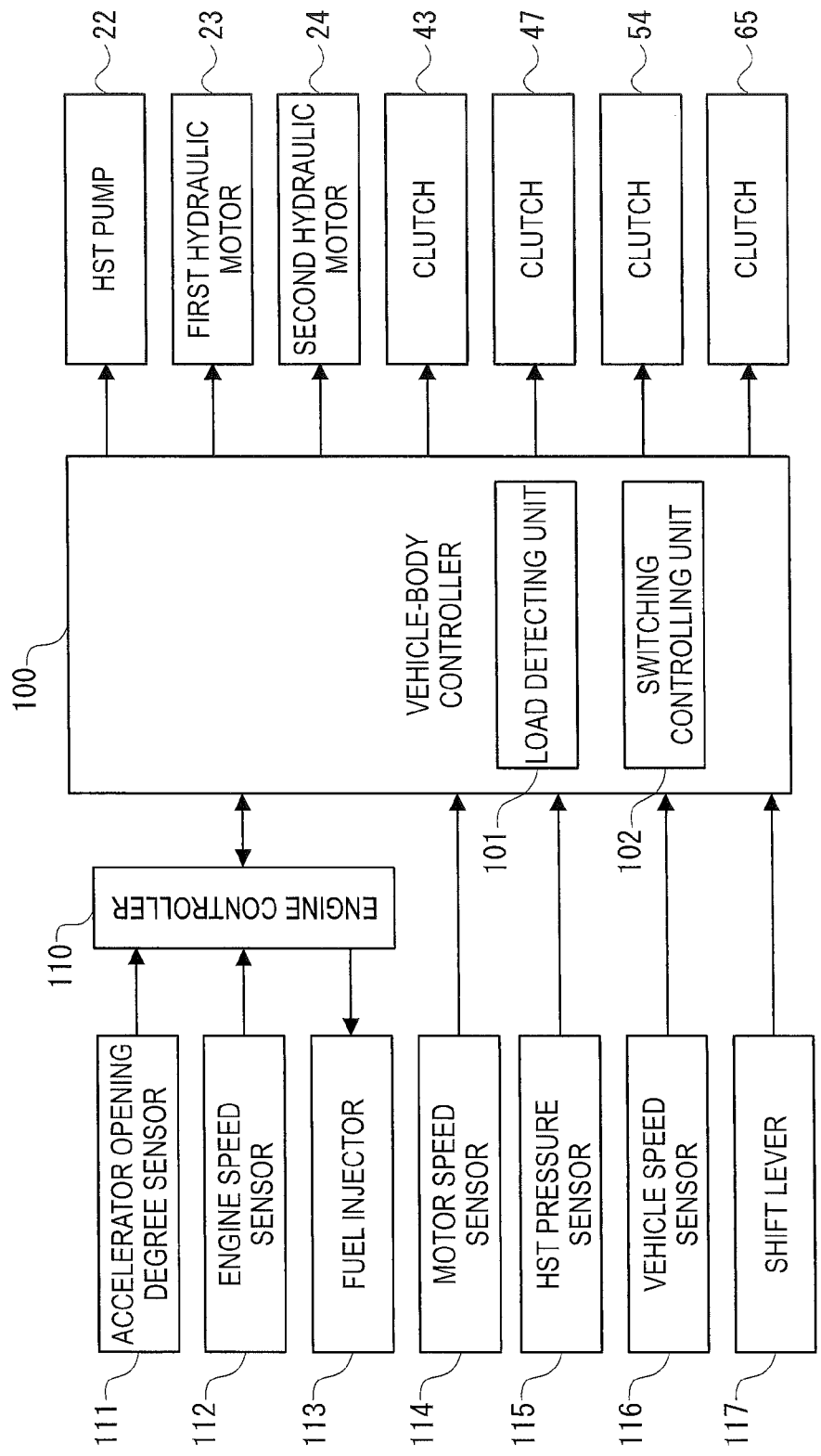
FIG. 3 is a block diagram showing a control circuit that controls the transmission.

As shown in FIG. 3, the control circuit mainly includes a vehicle-body controller 100 and an engine controller 110.

The vehicle-body controller 100 is configured to communicate with the engine controller 110. The vehicle-body controller 100 receives detection signals inputted from sensors provided to the wheel loader 1, which include a motor speed sensor 114, an HST pressure sensor 115, a vehicle speed sensor 116 and a shift lever 117.

Engine Controller

The engine controller 110 receives detection data outputted from an accelerator opening degree sensor 111 and an engine speed sensor 112 and controls a fuel injector 113. The engine controller 110 is configured to communicate with the vehicle-body controller 100.

Accelerator Opening Degree Sensor

The accelerator opening degree sensor 111 detects an operation amount (accelerator opening degree) of an accelerator pedal that is provided in the cab 6 and operated by an operator and outputs the detected accelerator opening degree to the engine controller 110.

Engine Speed Sensor

The engine speed sensor 112 detects an actual engine speed of the engine 8 and outputs the detected engine speed to the engine controller 110.

Fuel Injector

The fuel injector 113 employs a common rail fuel injection system including, for instance, a fuel pump, a common rail and an injector.

The engine controller 110 controls the fuel injector 113 in accordance with the accelerator opening degree outputted from the accelerator opening degree sensor 111 to control an output torque and engine speed of the engine 8.

Motor Speed Sensor

The motor speed sensor 114, which is a sensor for detecting respective rotation speeds of the output shafts 23A, 24A of the first hydraulic motor 23 and the second hydraulic motor 24, outputs detected motor speed signals to the vehicle-body controller 100.

It should be noted that the motor speed sensor 114 may indirectly detect the respective rotation speeds of the output shafts 23A, 24A from, for instance, the swash plate angle of the HST pump 22, the angled piston angles of the hydraulic motors 23, 24 and the pressure of the hydraulic oil in the hydraulic circuit A instead of directly detecting the rotation speeds.

HST Pressure Sensor

The HST pressure sensor 115, which is provided in the hydraulic circuit A, detects the pressure of the hydraulic oil in the hydraulic circuit A and outputs a detected pressure signal to the vehicle-body controller 100.

Vehicle Speed Sensor

The vehicle speed sensor 116, which is a sensor for detecting a vehicle speed from a rotation speed of a tire drive axle, outputs a detected vehicle speed signal to the vehicle-body controller 100.

Shift Lever

The shift lever 117 is provided near a steering column in the cab 6. An operator operates the shift lever 117 to switch forward and reverse gear positions. The switched gear position is electrically detected.

When the first forward gear is selected using the shift lever 117, the vehicle-body controller 100 maintains the first forward gear. Also when the second forward gear is selected, the vehicle-body controller 100 automatically switches between the first forward gear and the second forward gear in accordance with a load detected by a load detecting unit 101 as described later.

When the third forward gear is selected using the shift lever 117, the vehicle-body controller 100 automatically switches among the first to third forward gears in accordance with a load detected by the load detecting unit 101. When the fourth forward gear is selected using the shift lever 117, the vehicle-body controller 100 automatically switches among the first to fourth forward gears in accordance with a load detected by the load detecting unit 101.

It should be noted that the shift lever 117 may be replaced by a lever for switching between forward and reverse travels and a shift control switch for setting a gear position.

Vehicle-Body Controller

The vehicle-body controller 100 includes the load detecting unit 101 and a switching controlling unit 102 for controlling switching between the hydraulic drive and the mechanical drive. The vehicle-body controller 100 controls the engine 8, the HST pump 22, the first hydraulic motor 23, the second hydraulic motor 24 and the clutches 43, 47, 54, 65 based on output signals from the engine controller 110, the sensors 114, 115, 116 and the shift lever 117 and the switching controlling unit 102 of the vehicle-body controller 100 as described later. Specifically, the vehicle-body controller 100 controls, for instance, the output torque and engine speed of the engine 8, the swash plate angle of the HST pump 22, the angled piston angles of the hydraulic motors 23, 24 and respective engagement conditions of the clutches 43, 47, 54, 65.

Load Detecting Unit

The load detecting unit 101 detects the load on a wheel loader 1. The load includes a running load and a working equipment load. Since the engine 8 is a power source for both of traveling and the working equipment, the load detecting unit 101 detects the load of traveling and the working equipment load collectively as the "load".

The load can be found based on the accelerator opening degree detected by the accelerator opening degree sensor 111 and the engine torque estimated from a fuel injection amount of the fuel injector 113. The load detecting unit 101 thus calculates the load based on the accelerator opening degree and fuel injection amount data outputted from the engine controller 110.

Switching Controlling Unit

Figure 4:
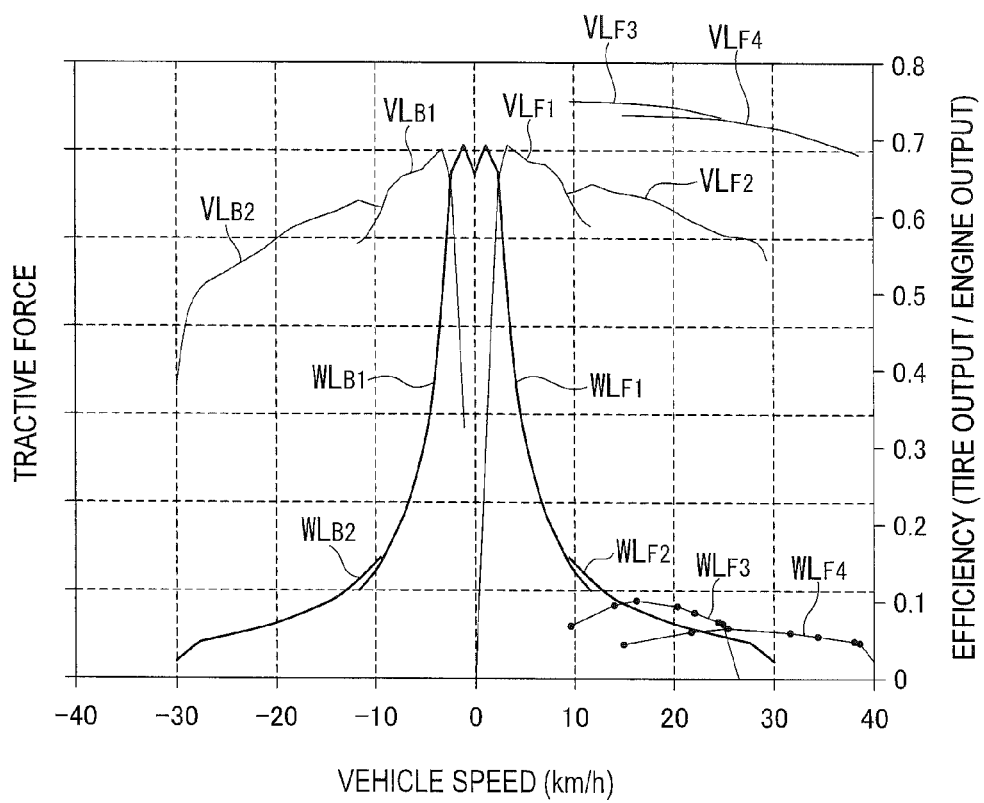
FIG. 4 is a graph showing a relationship between tractive force, efficiency and vehicle speed.

The switching controlling unit 102 sets a switching vehicle speed (a switching point) with reference to a switching control map for setting conditions for switching between the hydraulic drive and the mechanical drive. The switching control map is made based on a characteristic diagram of FIG. 4, which shows a relationship between tractive force and vehicle speed and a relationship between efficiency and vehicle speed. In FIG. 4, a line $WL_{F1}$ denotes characteristics between tractive force and vehicle speed at the first forward gear, a line $WL_{F2}$ denotes characteristics between tractive force and vehicle speed at the second forward gear, a line $WL_{F3}$ denotes characteristics between tractive force and vehicle speed at the third forward gear, a line $WL_{F4}$ denotes characteristics between tractive force and vehicle speed at the fourth forward gear, a line $WL_{B1}$ denotes characteristics between tractive force and vehicle speed at the first reverse gear, and a line $WL_{B2}$ denotes characteristics between tractive force and vehicle speed at the second reverse gear.

Further, a line $VL_{F1}$ denotes characteristics between efficiency and vehicle speed at the first forward gear, a line $VL_{F2}$ denotes characteristics between efficiency and vehicle speed at the second forward gear, a line $VL_{F3}$ denotes characteristics between efficiency and vehicle speed at the third forward gear, a line $VL_{F4}$ denotes characteristics between efficiency and vehicle speed at the fourth forward gear, a line $VL_{B1}$ denotes characteristics between efficiency and vehicle speed at the first reverse gear, and a line $VL_{B2}$ denotes characteristics between efficiency and vehicle speed at second reverse gear. It should be noted that the efficiency is a ratio of a tire output to an engine output.

Vehicle Speed Range at Gear Position

As shown in FIG. 4, vehicle speeds available under the mechanical drive cover the maximum forward vehicle speed. In a forward medium vehicle speed range, vehicle speeds available under the mechanical drive overlap with vehicle speeds available under the hydraulic drive. For instance, a vehicle speed range of from 0 to 30 km/h may be covered at the first and second forward gears under the hydraulic drive, a vehicle speed range of from 15 to 23 km/h may be covered at the third forward gear under the mechanical drive, and a vehicle speed range of from 21.5 to 38 km/h at the fourth forward gear under the mechanical drive. In this case, a vehicle speed range of from 15 to 30 km/h is selectable either under the hydraulic drive or under the mechanical drive.

Setting of Vehicle Speed for Switching from Hydraulic Drive to Mechanical Drive

As long as the vehicle speed is in an overlapping vehicle speed range available by both of the hydraulic drive and the mechanical drive, the hydraulic drive may be switched to the mechanical drive. In order to reduce a switching shock, the switching controlling unit 102 sets the switching vehicle speed (the switching point).

Figure 5:
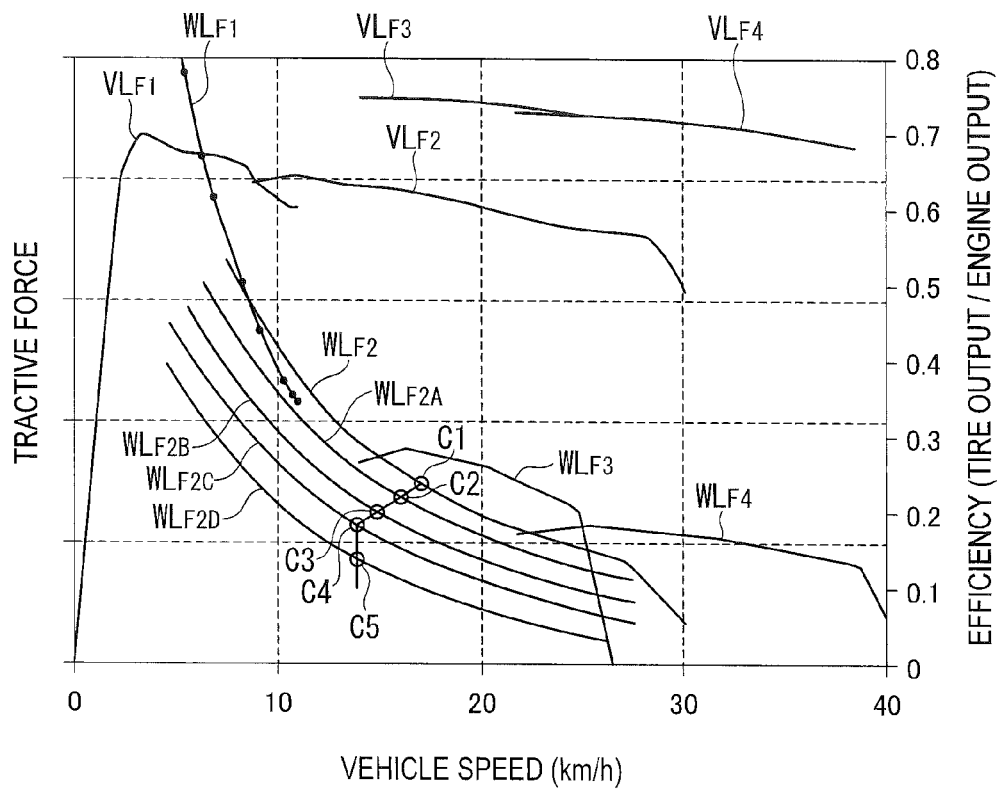
FIG. 5 is a graph showing a switching point for switching hydraulic drive and mechanical drive.

For instance, the switching controlling unit 102 sets the switching point with reference to the switching control map, i.e., a characteristic curve between a tractive force and vehicle speed (hereinafter, referred to as "tractive force curve") at the second forward gear as shown in FIG. 5. The line $WL_{F2}$ in FIG. 4 is a maximum tractive force curve obtained when the accelerator opening degree is set at "large". In the hydraulic drive, a plurality of tractive force curves can be obtained depending on the accelerator opening degree. In FIG. 5, five tractive force curves $WL_{F2}$, $WL_{F2A}$, $WL_{F2B}$, $WL_{F2C}$ and $WL_{F2D}$ are defined in descending order in terms of the accelerator opening degree.

According to the switching control map, switching vehicle speeds (switching points) C1 to C5, at which the second forward gear (the hydraulic drive) can be switched to the third forward speed (the mechanical drive), are respectively defined in the tractive force curves $WL_{F2}$, $WL_{F2A}$, $WL_{F2B}$, $WL_{F2C}$ and $WL_{F2D}$. Specifically, the vehicle-body controller 100 selects one of the tractive force curves in accordance with the accelerator opening degree detected by the accelerator opening degree sensor 111, and switches from the second forward gear (the hydraulic drive) to the third forward gear (the mechanical drive) when the vehicle speed detected by the vehicle speed sensor 116 reaches the vehicle speed of the switching point defined in the selected tractive force curve.

The value of the switching point (the switching vehicle speed) becomes smaller as the accelerator opening degree becomes smaller (the load becomes smaller), and becomes larger as the accelerator opening degree becomes larger. As a result, the smaller the load is, the earlier the gear position is switched to the third forward gear.

Reasons for Setting of Vehicle Speed for Switching from Hydraulic Drive to Mechanical Drive The above setting is necessary for the following reasons. When the accelerator opening degree becomes larger, the engine speed of the engine 8 becomes higher due to the necessity of a larger horsepower. In order to improve efficiency (fuel efficiency), it is preferable that the hydraulic drive should be switched to the mechanical drive at a vehicle speed as low as possible as described above. However, since the maximum horsepower is required according to the maximum tractive force curve $WL_{F2}$, the engine speed of the engine 8 cannot be significantly reduced.

However, for a smooth gear shift with a reduced switching shock, the engine speed of the engine 8 obtained under the hydraulic drive immediately before the hydraulic drive is switched to the mechanical drive should not be significantly different from the engine speed of the engine 8 obtained immediately after the hydraulic drive is switched to the mechanical drive. Accordingly, on the maximum tractive force curve $WL_{F2}$, the vehicle speed under the hydraulic drive immediately before switching needs to be set relatively high so that the engine speed of the engine 8 is increased prior to switching to the mechanical drive.

As long as the running load and the accelerator opening degree are small (e.g., when the wheel loader 1 travels on a flat ground), the engine speed of the engine 8 under the hydraulic drive can be kept low and thus a further increase in horsepower is available. Therefore, while the engine speed of the engine 8 is suppressed to be low, the vehicle speed can be increased by appropriately adjusting the swash plate angle of the HST pump 22 and the angled piston angle of the second hydraulic motor 24. In this case, since the engine speed of the engine 8 can be suppressed to be low, switching to a lower vehicle speed can be performed while a difference between engine speeds before and after the switching is kept small.

It should be noted that a lower limit is set to deal with a rapid change in the load. The switching points (the switching vehicle speeds or switching timings) C1 to C5 are defined on the tractive force curves $WL_{F2}$ to $WL_{F2D}$ in accordance with the accelerator opening degree in view of the lower limit.

Specifically, in the case where the vehicle speed is increased under the hydraulic drive, the vehicle-body controller 100 selects one of the tractive force curves in accordance with the accelerator opening degree (i.e., load), and switches from the hydraulic drive to the mechanical drive when the vehicle speed of the switching point defined on the selected tractive force curve is reached.

It should be noted that the engine torque under the mechanical drive is variable and the vehicle speed is only required to change along a tractive force curve substantially identical to a line defined for a case where the vehicle continuously travels under the hydraulic drive. Therefore, the torque produced by the engine 8 may be reduced to improve fuel efficiency.

The switching controlling unit sets the switching point(s) with reference to the switching control map but may calculate the switching point(s). For instance, the switching point(s) (vehicle speed(s)) may be calculated by substituting the gear position and the accelerator opening degree (load) in a predetermined calculating formula. Alternatively, a calculating formula may be prepared for each of the gear positions to be selected, and the switching point may be calculated by substituting the accelerator opening degree (load) in the calculating formula for selected one of the gear positions.

Description of Switching of Power Transmission

When the wheel loader 1 including the above transmission 20 is in, for instance, a V-shape operation including traveling forward while performing excavation using the bucket 3 and traveling forward or reversing for a short distance with a load, the first forward gear or the first reverse gear of the HST drive is usually selected due to a large running load.

When the wheel loader 1 travels for a middle distance or when the vehicle speed needs to be increased with a large running load (e.g., snow removal), the second forward gear or the second reverse gear of the HST drive is selected.

When the vehicle is unloaded and travels with a small running load (e.g., traveling up a slope), the third forward gear of the mechanical drive is selected. When the wheel loader 1 travels on a flat ground with a slight running load, the forward fourth gear of the mechanical drive is selected. Although the wheel loader 1 is not supposed to reverse under the mechanical drive in the exemplary embodiment, a reverse gear may be provided to allow the wheel loader 1 to reverse under the mechanical drive.

Description will be made below on a power transmitting process and a gear shifting method for each gear position.

Power Transmission at First Forward Gear and First Reverse Gear

Description will be made on power transmission at the first forward gear and the first reverse gear with reference to FIG. 6. Incidentally, in FIG. 6 and FIGS. 7 to 9 (described later), a power transmission route for the selected gear position is denoted by solid lines, whereas a route unrelated to the power transmission is denoted by chain lines.

When the first forward gear or the first reverse gear is selected, the vehicle-body controller 100 disengages the clutches 43, 47 of the mechanical drive unit 21. Consequently, no power is transmitted through the mechanical drive unit 21.

The vehicle-body controller 100 engages the clutches 54, 65. In this state, the power from the first hydraulic motor 23 and the power from the second hydraulic motor 24 are inputted to the power combining unit 25C through the first hydraulic drive unit 25A and the second hydraulic drive unit 25B to be combined, and then transmitted to the output shaft 20B.

Tractive Force and Efficiency at First Forward Gear and First Reverse Gear

When the first forward gear or the first reverse gear is selected, the power is transmitted from the two hydraulic motors 23, 24. As a result, although the vehicle speed is low, a large tractive force can be produced as shown by the line $WL_{F1}$ and the line $WL_{B1}$ in FIG. 4. A low-speed operation requiring a large tractive force (e.g., excavation) can thus be performed as described above. It is not necessary to wastefully increase the engine speed as in a driving system using a torque converter that transmits a torque based on a rotation speed difference.

The above hydraulic static transmission drive using the two hydraulic motors 23, 24 can smoothly change the speed without any gear shift shock and thus improves efficiency.

Further, the HST pump 22 is a bidirectional hydraulic pump and the hydraulic motors 23, 24 are capable of bidirectional rotation hydraulic motor, so that switching between forward travel and reverse travel can be smoothly performed.

Power Transmission at Second Forward Gear and Second Reverse Gear

Description will be made on power transmission at the second forward gear and the second reverse gear with reference to FIG. 7.

When the second forward gear or the second reverse gear is selected, the vehicle-body controller 100 disengages the clutches 43, 47 of the mechanical drive unit 21 and thus no power is transmitted through the mechanical drive unit 21.

The vehicle-body controller 100 engages the clutch 54, disengages the clutch 65 of the first hydraulic motor 23, and sets the angled piston angle of the first hydraulic motor 23 at zero degrees. Consequently, no output from the first hydraulic motor 23 is provided, and power transmission from the first combining gear 52 to the first hydraulic motor 23 is inhibited. The power from the second hydraulic motor 24 is thus reliably transmitted to the output shaft 20B.

Tractive Force and Efficiency at Second Forward Gear and Second Reverse Gear

When the second forward gear or the second reverse gear is selected, the power is transmitted from the single hydraulic motor 24. As a result, while a certain amount of tractive force is ensured, the vehicle speed can be increased as shown by the line $WL_{F2}$ and the line $WL_{B2}$ in FIG. 4. Further, the power transmission according to the exemplary embodiment is a continuously variable transmission, so that the vehicle speed can be smoothly changed without any gear shift shock and switching between forward travel and reverse travel can be smoothly performed. The wheel loader 1 can thus work while traveling (e.g., transportation of soil and sand and snow removal).

However, as shown by the line $VL_{F2}$ and the line $VL_{B2}$ in FIG. 4, efficiency is lowered as compared with the first forward gear and the first reverse gear. Therefore, the hydraulic drive should preferably be switched to the mechanical drive as soon as possible.

Engine Braking Operation

During traveling at the second forward gear or the first forward gear, engine brake is applied, for instance, when the engine speed of the engine 8 is rapidly reduced or the vehicle rolls down a steep slope. Specifically, in the above situations, the power transmitted from the tires exceeds the power outputted from the hydraulic drive unit 25, so that the first hydraulic motor 23 and the second hydraulic motor 24, which are in conjunction with each other through the clutches 54, 65, are adversely biased with an increased speed to function as hydraulic pumps. Consequently, the inlet side of the HST pump 22 receives the inflow of a hydraulic oil with a higher pressure than a hydraulic oil at the outlet side, so that the HST pump 22 functions as a hydraulic motor. The engine 8 is thus adversely biased by the HST pump 22 to apply engine brake.

Power Transmission by Mechanical Drive Unit (Third Forward Gear and Fourth Forward Gear)

Next, description will be made on power transmission by the mechanical drive unit 21 related to the third and fourth forward gears. It should be noted that the exemplary embodiment employs no mechanical drive switching clutch for reverse because it causes a large loss during forward traveling. Accordingly, a vehicle speed range where the vehicle can travel under the hydraulic drive covers a range where the vehicle works while traveling forward and a range where the vehicle reverses. Further, the reverse vehicle speed range is not necessarily equal to or more than the forward vehicle speed range under the hydraulic drive, and is approximately not more than 30 km/h in the exemplary embodiment.

Power Transmission at Third Forward Gear

Next, description will be made on power transmission at the third forward gear with reference to FIG. 8.

When the third forward gear where the power is transmitted through the mechanical drive unit 21 is selected, the vehicle-body controller 100 disengages the clutches 54, 65. Further, the vehicle-body controller 100 sets the swash plate angle of the HST pump 22 and the angled piston angles of the hydraulic motors 23, 24 at zero degrees. No power generated by the HST drive is thus transmitted to the output shaft 20B.

The vehicle-body controller 100 engages the clutch 47 of the mechanical drive unit 21 while disengaging the clutch 43. In the above state, since the gear 41 does not rotate, the power inputted to the engine shaft 20A is transmitted from the gear 42 to the gear 46, from the gear 46 to the gear 45 through the clutch 47 and further to the gear 48 through the intermediate shaft 44. The power is then transmitted from the gear 48 to the first combining gear 52 through the gear 51 and the combining shaft 49, from the first combining gear 52 to the gear 55, and further to the output shaft 20B. Since the clutch 43 is disengaged, the gear 41, which meshes with the gear 45, spins around the engine shaft 20A.

Tractive Force and Efficiency at Third Forward Gear

When the third forward gear of the mechanical drive is selected, efficiency can be improved with a certain amount of tractive force being ensured as shown by the line $WL_{F3}$, the line $WL_{B3}$, the line $VL_{F3}$ and the line $VL_{B3}$ in FIG. 4. Accordingly, for instance, when the vehicle is unloaded and travels with a large running load (e.g., traveling up a slope), the third forward gear of the mechanical drive is selected.

Power Transmission at Fourth Forward Gear

Next, description will be made on power transmission at the fourth forward gear with reference to FIG. 9.

When the fourth forward gear where the power is transmitted through the mechanical drive unit 21 is selected, the vehicle-body controller 100 keeps the clutches 54, 65 disengaged and keeps the swash plate angle of the HST pump 22 and the angled piston angle of each of the hydraulic motors 23, 24 at zero degrees in the same manner as when the third forward gear is selected.

Further, the vehicle-body controller 100 engages the clutch 43 of the mechanical drive unit 21 while disengaging the clutch 47. In the above state, the power inputted to the engine shaft 20A is transmitted from the gear 42 to the gear 41 through the clutch 43, from the gear 41 to the gear 45 and further to the gear 48 through the intermediate shaft 44. The power is further transmitted in the same manner as when the third forward gear is selected. Since the clutch 47 is disengaged, the gear 46, which meshes with the gear 42, spins around the intermediate shaft 44.

Tractive Force and Efficiency at Fourth Forward Gear

When the fourth forward gear of the mechanical drive is selected, the tractive force becomes smaller than one obtained when the third forward gear is selected, but efficiency can be improved as shown by the line $WL_{F4}$, the line $WL_{B4}$, the line $VL_{F4}$ and the line $VL_{B4}$ in FIG. 4. Accordingly, for instance, when the vehicle is unloaded and travels with a small running load (e.g., traveling on a flat ground), the fourth forward gear of the mechanical drive is selected.

Control of HST Pump for Mechanical Drive

Even when the power is transmitted by the mechanical drive unit 21, the HST pump 22 is driven. However, the swash plate angle of the swash-plate type HST pump 22 is set at zero degrees not to discharge the hydraulic oil. The displacement of the HST pump 22 is thus controlled to be zero so that the HST pump 22 is driven with substantially no load. Consequently, the power consumption of the HST pump 22 is sufficiently reduced to be ignored.

Control of Hydraulic Motor for Mechanical Drive

When the power is transmitted by the mechanical drive unit 21, the clutches 54, 65 are disengaged and the angled piston angle of each of the first hydraulic motor 23 and the second hydraulic motor 24 is set at zero degrees. The power consumption of the hydraulic motors 23, 24 can thus be reduced.

In other words, since the clutch 54 is disengaged, the rotation of the first combining gear 52 caused by the mechanical drive unit 21 is not transmitted to the output shaft 24A of the second hydraulic motor 24.

While the planetary gear 62, which meshes with the first combining gear 52, rotates, the first hydraulic motor 23 is prevented from being adversely biased by a sufficiently large loss torque due to friction caused when the angled piston angle of the first hydraulic motor 23 is set at zero degrees. The first hydraulic motor 23 is thus in a state as if it were connected to a fixed clutch. The ring gear 64 thus does not rotate at a rotation speed corresponding to the planetary gear ratio and, consequently, the rotation of the first combining gear 52 caused by the mechanical drive unit 21 is not transmitted to the output shaft 23A of the first hydraulic motor 23.

It should be noted that when the clutch 65 is not disengaged, the rotation of the first combining gear 52 may be unexpectedly accelerated by the planetary mechanism to adversely bias the first hydraulic motor 23 at an excessively high speed. Accordingly, also in terms of the durability of the first hydraulic motor 23, it is preferable that the clutch 65 is disengaged while the angled piston angle is set at zero degrees.

In the mechanical drive, as long as at least the displacement of the HST pump 22 is controlled to be zero, the displacement of each of the hydraulic motors 23, 24 may not be set at zero. However, the swash plate angle of the HST pump 22 and the angled piston angle of each of the hydraulic motors 23, 24 are preferably set at zero to control the displacement thereof to be zero as in the exemplary embodiment in terms of prevention of wasteful power consumption.

Acceleration Gear Shifting Process for Switching from Hydraulic Drive to Mechanical Drive Next, description will be made on a gear shifting process for switching from the hydraulic drive to the mechanical drive.

As described above, since the mechanical drive is higher in efficiency than the hydraulic drive, the speed for switching from the hydraulic drive to the mechanical drive is preferably reduced as much as possible in order to improve fuel efficiency.

Accordingly, with reference to a flow chart of FIG. 10, description will be made on an acceleration gear shifting process performed when the shift lever 117 is set at the third or fourth forward gear position and the hydraulic drive (the first and second forward gears) is automatically switched to the mechanical drive (the third and fourth forward gears) in accordance with a load.

As an operator operates the accelerator to increase the vehicle speed, the vehicle-body controller 100 shifts the first forward gear set using the two hydraulic motors 23, 24 to the second forward gear set only using the second hydraulic motor 24 in accordance with the accelerator opening degree detected by the accelerator opening degree sensor 111 (step S1).

As the operator operates the accelerator to further increase the vehicle speed, the switching controlling unit 102 of the vehicle-body controller 100 selects one of the tractive force curves $WL_{F2}$ to $WL_{F2D}$ stored in the switching control map in accordance with the accelerator opening degree detected by the accelerator opening degree sensor 111 (step S2).

The vehicle-body controller 100 performs a clutch operation for engaging the clutch 47 and disengaging the clutch 54 when the vehicle speed detected by the vehicle speed sensor 116 reaches the switching point defined on the selected tractive force curve to switch from the hydraulic drive (the second forward gear) to the mechanical drive (the third forward gear) (step S3).

Further, the vehicle-body controller 100 performs a clutch operation for engaging the clutch 43 and disengaging the clutch 47 when determining that a running load is small (e.g., the vehicle travels on a flat ground without a load thereon)

based on the accelerator opening degree and the running load to switch to the fourth forward gear of the mechanical drive (step S4).

The acceleration gear shifting process is thus completed (step S5).

Since the exemplary embodiment employs the switching controlling unit 102, the switching point (switching vehicle speed) can be set high to increase the engine speed under the mechanical drive when a load is large (an accelerator opening degree is large) and the engine speed under the hydraulic drive is high. The exemplary embodiment thus allows for a relatively small difference between engine speeds before and after the switching. Consequently, the hydraulic drive can be smoothly switched to the mechanical drive with a reduced switching shock resulting from gear shift, thereby preventing a load in the bucket 3 from falling off.

Similarly, the switching point (switching vehicle speed) can be set low to reduce the engine speed under the mechanical drive when a load is small (an accelerator opening degree is small) and the engine speed under the hydraulic drive is low. The exemplary embodiment thus allows for a relatively small difference between engine speeds before and after the switching so that a switching shock resulting from gear shift can be reduced. Consequently, the hydraulic drive can be smoothly switched to the mechanical drive, thereby preventing a load in the bucket 3 from falling off. Further, the hydraulic drive can be switched to the mechanical drive early, thereby improving efficiency and reducing fuel consumption.

Measures for Reducing Gear Shift Shock

In order to engage/disengage the clutch(es) as smoothly as possible to switch from the hydraulic drive to the mechanical drive and, consequently, to further reduce a gear shift shock, the vehicle-body controller 100 preferably should collaterally take the following measures 1. Engine Speed Reducing Control In order to smoothly switch from the hydraulic drive to the mechanical drive, a difference between the engine speeds of the engine 8 before and after the switching preferably should be reduced as much as possible. Accordingly, since the engine speed of the engine 8 can be kept low and thus a further increase in horsepower is available when a load is small and an accelerator opening degree is small, the vehicle-body controller 100 adjusts the swash plate angle of the HST pump 22 and the angled piston angle of the second hydraulic motor 24 to increase the vehicle speed while further reducing the engine speed of the engine 8. Specifically, the swash plate angle is adjusted to increase the displacement of the HST pump 22 and/or the angled piston angle is adjusted to reduce the displacement of the second hydraulic motor 24, thereby increasing the vehicle speed while reducing the engine speed of the engine 8. It should be noted that at least one of the adjustment for increasing the displacement of the HST pump 22 and the adjustment for reducing the displacement of the second hydraulic motor 24 may be performed.

In the mechanical drive, since the gear ratio is fixed, the vehicle speed and the engine speed of the engine 8 are linearly proportional to each other. Accordingly, the engine speed at the third forward gear at the switching point (switching vehicle speed) of one of the tractive curves selected in accordance with a load is obtained, and the engine speed of the engine 8 under the hydraulic drive is controlled to be close to the obtained engine speed, thereby further reducing a difference in the engine speed of the engine 8 resulting from switching from the hydraulic drive to the mechanical drive and, consequently, further reducing a gear shift shock.

2. Engine Torque Reducing Control

When the hydraulic drive is switched to the mechanical drive and, consequently, efficiency is increased, a gear shift shock may be caused due to a rapid rise in torque. In order to avoid the above problem, a torque reducing control is performed during the gear shifting process to reduce a gear shift shock.

Specifically, the vehicle-body controller 100 sends a command to the engine controller 110 to adjust the timing and/or the amount of fuel injection during the process for switching from the hydraulic drive to the mechanical drive, and the engine controller 110 adjusts the injection amount of the fuel injector 113 in accordance with the command.

Torque generated when the hydraulic drive is switched to the mechanical drive can thus be reduced and, consequently, a gear shift shock is further reduced.

3. Modulation Clutch

The clutches 43, 47, 54, 65 of the exemplary embodiment are each in the form of a modulation clutch having a modulation pattern for reducing a shock to absorb a difference between the rotation speeds on the upstream and downstream of the clutch.

The modulation clutch is configured not only to be simply engaged (engagement ratio: 100%) and disengaged (engagement ratio: 0%) but also to slide (i.e., the engagement ratio can be adjusted to an interim value between 100% to 0% to adjust a transmission amount of the engine output). The engagement ratio of the modulation clutch can be adjusted by a plurality of processes. In the exemplary embodiment, the engagement ratio is determined based on a controlling hydraulic pressure applied to the clutch.

During the process for switching from the hydraulic drive to the mechanical drive, the vehicle-body controller 100 controls the controlling hydraulic pressure based on a variation pattern defined as the modulation pattern, so that the clutch is temporarily set in a so-called semi-clutch state (an interim value of the engagement ratio) to reduce a gear shift shock.

Deceleration Gear Shifting Process for Switching from Mechanical Drive to Hydraulic Drive Next, description will be made on a deceleration gear shifting process for switching from the mechanical drive to the hydraulic drive.

In switching from the mechanical drive to the hydraulic drive, the vehicle-body controller 100 starts moving the angled piston of the second hydraulic motor 24 and the swash plate of the HST pump 22 before the clutch 54 is engaged. Specifically, the vehicle-body controller 100 sets the swash plate angle of the HST pump 22 to an angle corresponding to the engine speed of the engine 8, and adjusts the angled piston angle of the second hydraulic motor 24 so that the motor speed of the second hydraulic motor 24 corresponds to the resulting flow rate and vehicle speed (step S11).

Next, the vehicle-body controller 100 engages the clutch 54 when the motor speed of the second hydraulic motor 24 is increased and a difference between the rotation speed of the first combining gear 52 and the rotation speed of the second combining gear 53 disposed on the upstream and downstream of the clutch 54 reaches a threshold or less (step S12). The power transmitted through the mechanical drive unit 21 and the power transmitted from the second hydraulic motor 24 through the second hydraulic drive unit 25B are thus temporarily combined by the power combining unit 25C and transmitted to the output shaft 20B.

The vehicle-body controller 100 then disengages the clutch 47 of the mechanical drive unit 21 when the pressure of the hydraulic circuit A detected by the HST pressure sensor 115 increases to exceed a threshold (step S13).

The deceleration gear shifting process for switching from the mechanical drive to the hydraulic drive is thus completed (step S14).

In switching from the mechanical drive to the hydraulic drive, since the angled piston angle of the second hydraulic motor 24 is zero degrees, the motor speed is 0 rpm (a stopped state). In contrast, the engine speed of the engine 8 changes in accordance with the vehicle speed, and may be set approximately in a range from 1200 to 1400 rpm. Since the second hydraulic motor 24 has a small inertia, the clutch 54 may be engaged with the second hydraulic motor 24 being in the stopped state. However, the clutch 54 should preferably be engaged after the motor speed of the second hydraulic motor 24 is increased to a certain level. In this case, a difference between motor speeds before and after the switching can be reduced and, consequently, the mechanical drive can be smoothly switched to the hydraulic drive. In the deceleration process, the mechanical drive is switched to the hydraulic drive via a combination of the mechanical drive and the hydraulic drive. The mechanical drive can thus be smoothly switched to the hydraulic drive with a reduced switching shock during the deceleration process, thereby preventing a load in the bucket 3 from falling off during the deceleration process.

Incidentally, it should be understood that the scope of the present invention is not limited to the above-described exemplary embodiment(s) but includes modifications and improvements compatible with the invention.

For instance, although the exemplary embodiment employs the two hydraulic motors, i.e., the first hydraulic motor 23 and the second hydraulic motor 24, a single hydraulic motor for traveling may be employed without departing from the scope of the invention. Alternatively, three or more hydraulic motors for traveling may be employed without departing from the scope of the invention.

Although the mechanical drive unit 21 includes the clutches 43, 47 to switch between two gear positions, i.e., the third forward gear and the fourth forward gear, three or more switchable gear positions may be provided or merely a single gear position is provided.

In the exemplary embodiment, the load of the wheel loader 1 (including work load and running load) is detected as an accelerator opening degree and the switching point (switching timing) for switching between the hydraulic drive and the mechanical drive is adjusted in accordance with the accelerator opening degree and the vehicle speed. Alternatively, the load of the wheel loader 1 may be detected using other parameter(s) such as the fuel injection amount of the engine 8.

The specific gear arrangements of the mechanical drive unit 21 and the hydraulic drive unit 25 are not limited to those of the exemplary embodiment. For instance, the mechanical drive unit 21 may include: two gears fixed to the engine shaft 20A; another two gears that individually mesh with the two gears and are rotatably supported by the intermediate shaft 44; and a clutch provided to a single gear fixed to the intermediate shaft 44.

A gear of the mechanical drive unit 21 and a gear of the hydraulic drive unit 25 may be individually fixed to the output shaft 20B, and the mechanical drive unit 21 and the hydraulic drive unit 25 may be independent of each other.

Further, the power transmitted through the first hydraulic drive unit 25A and the power transmitted through the second hydraulic drive unit 25B may be combined at the gear 55 fixed to the output shaft 20B.

In other words, the gear arrangement of the transmission 20 may be determined in view of, for instance, the sizes and layouts of the wheel loader 1, the engine 8, the HST pump 22 and the hydraulic motors 23, 24.

The invention claimed is:

1. A wheel loader comprising:
    an engine;
    a drive shaft;
    a transmission comprising an input shaft through which a power from the engine is inputted and an output shaft through which the power from the engine is outputted to the drive shaft, the transmission being configured to perform a gear-shifting operation between the input shaft and the output shaft;
    a mechanical drive unit comprising a plurality of gear trains driven by the power from the engine;
    a mechanical drive clutch provided to the mechanical drive unit to control transmission and cutoff of the power from the engine;
    a variable displacement hydraulic pump configured to be driven by the power from the engine to deliver a hydraulic oil for traveling;
    a variable displacement hydraulic motor configured to be driven by the hydraulic oil delivered from the hydraulic pump;
    a hydraulic drive unit comprising a plurality of gear trains driven by a power from the hydraulic motor;
    a hydraulic drive clutch provided to the hydraulic drive unit to control transmission and cutoff of the power from the hydraulic motor;
    a load detecting unit configured to detect an amount of a load driven by the power from the engine;
    a vehicle speed detecting unit configured to detect a vehicle speed;
    a switching controlling unit configured to set a switching vehicle speed in accordance with the amount of the load, the switching controlling unit setting the switching vehicle speed at a high-speed side when the load becomes large and setting the switching vehicle speed at a low-speed side when the load becomes small; and
    a controller configured to switch between a hydraulic drive state where the output shaft is driven by the hydraulic drive unit and a mechanical drive state where the output shaft is driven by the mechanical drive unit based on the switching controlling unit,
    the controller controlling the mechanical drive clutch and the hydraulic drive clutch to switch from the hydraulic drive state to the mechanical drive state when the vehicle speed detected by the vehicle speed detecting unit reaches the switching vehicle speed set by the switching controlling unit in accordance with the load detected by the load detecting unit during acceleration of the wheel loader in the hydraulic drive state.

2. The wheel loader according to claim 1, wherein the controller lowers an engine speed and increases a displacement of the hydraulic pump and/or reduces a displacement of the hydraulic motor before switching from the hydraulic drive state to the mechanical drive state.

3. The wheel loader according to claim 1, wherein the controller controls fuel injection to the engine to reduce an engine torque when switching from the hydraulic drive state to the mechanical drive state.

4. The wheel loader according to claim 1, wherein
    the hydraulic pump and the hydraulic motor each have a variable displacement, and
    the controller controls at least the displacement of the hydraulic pump to be zero after switching from the hydraulic drive state to the mechanical drive state.

5. The wheel loader according to claim 1, wherein the controller increases the motor speed of the hydraulic motor before switching from the mechanical drive state to the hydraulic drive state during deceleration of the wheel loader in the mechanical drive state.

6. The wheel loader according to claim 1, wherein each of mechanical drive clutch and the hydraulic drive clutch is a modulation clutch.

7. The wheel loader according to claim 1, wherein the mechanical drive unit is used only when the wheel loader travels forward, and the wheel loader reverses only using the hydraulic drive unit.

8. A wheel loader comprising:
an engine;
a drive shaft;
a transmission comprising an input shaft through which a power from the engine is inputted and an output shaft through which the power from the engine is outputted to the drive shaft, the transmission being configured to perform a gear-shifting operation between the input shaft and the output shaft;
a mechanical drive unit comprising a plurality of gear trains driven by the power from the engine;
a mechanical drive clutch provided to the mechanical drive unit to control transmission and cutoff of the power from the engine;
a variable displacement hydraulic pump configured to be driven by the power from the engine to deliver a hydraulic oil for traveling;
a variable displacement hydraulic motor configured to be driven by the hydraulic oil delivered from the hydraulic pump;
a hydraulic drive unit comprising a plurality of gear trains driven by a power from the hydraulic motor;
a hydraulic drive clutch provided to the hydraulic drive unit to control transmission and cutoff of the power from the hydraulic motor;
a vehicle speed detecting unit configured to detect a vehicle speed; and
a controller configured to switch between a hydraulic drive state where the output shaft is driven by the hydraulic drive unit and a mechanical drive state where the output shaft is driven by the mechanical drive unit, wherein
in order to switch from the mechanical drive state to the hydraulic drive state during deceleration of the wheel loader in the mechanical drive state, the controller:
sets a displacement of the hydraulic pump at a value corresponding to an engine speed;
adjusts a displacement of the hydraulic motor to make a motor speed of the hydraulic motor become a value corresponding to a discharge amount of the hydraulic pump and the vehicle speed; and
engages the hydraulic drive clutch when a difference between rotation speeds on upstream and downstream of the hydraulic drive clutch reaches a threshold or less and disengages the mechanical drive clutch when a pressure of the hydraulic oil delivered from the hydraulic pump to the hydraulic motor increases to a predetermined value or more.

9. The wheel loader according to claim 8, wherein the controller increases the motor speed of the hydraulic motor before switching from the mechanical drive state to the hydraulic drive state during deceleration of the wheel loader in the mechanical drive state.

10. The wheel loader according to claim 8, wherein each of mechanical drive clutch and the hydraulic drive clutch is a modulation clutch.

11. The wheel loader according to claim 8, wherein the mechanical drive unit is used only when the wheel loader travels forward, and the wheel loader reverses only using the hydraulic drive unit.

* * * * *